United States Patent
Liu et al.

(10) Patent No.: US 8,112,998 B2
(45) Date of Patent: Feb. 14, 2012

(54) APPARATUS AND METHOD FOR COOLING A TURBINE USING HEAT PIPES

(75) Inventors: Yang Liu, Simpsonville, SC (US); Hua Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 413 days.

(21) Appl. No.: 12/425,416

(22) Filed: Apr. 17, 2009

(65) Prior Publication Data

US 2010/0263350 A1 Oct. 21, 2010

(51) Int. Cl.
*F02C 1/00* (2006.01)

(52) U.S. Cl. .............................. 60/728; 60/806

(58) Field of Classification Search .................. 60/226.1, 60/266, 267, 728, 806, 782
See application file for complete search history.

(56) References Cited

U.S. PATENT DOCUMENTS

| | | | |
|---|---|---|---|
| 3,429,122 A * | 2/1969 | Pravda et al. | 60/487 |
| 3,651,645 A | 3/1972 | Grieb | |
| 4,045,197 A * | 8/1977 | Tsai et al. | 65/27 |
| 4,313,795 A * | 2/1982 | Dauvergne | 376/280 |
| 4,315,893 A * | 2/1982 | McCallister | 422/109 |
| 6,389,797 B1 | 5/2002 | Sugishita et al. | |
| 2007/0022732 A1* | 2/2007 | Holloway et al. | 60/39.08 |
| 2007/0234729 A1 | 10/2007 | West et al. | |
| 2008/0053099 A1 | 3/2008 | Venkataramani et al. | |
| 2008/0053100 A1 | 3/2008 | Venkataramani et al. | |
| 2010/0162685 A1* | 7/2010 | Hirshberg | 60/266 |

\* cited by examiner

*Primary Examiner* — Louis Casaregola
*Assistant Examiner* — Phutthiwat Wongwian
(74) *Attorney, Agent, or Firm* — Nixon & Vanderhye P.C.

(57) ABSTRACT

The turbine section of the turbine engine is provided with a flow of cooling air which is taken from a compressor section of the turbine engine. The air received from the compressor section is itself cooled before the air is delivered to the turbine. Heat is removed from the flow of air by a plurality of heat pipes which conduct heat away from the flow of air to lower the temperature of the air before it is provided to the turbine.

13 Claims, 2 Drawing Sheets

APPARATUS AND METHOD FOR COOLING A TURBINE USING HEAT PIPES

BACKGROUND OF THE INVENTION

The invention is related to systems and methods for cooling the turbine section of a turbine engine. The turbine section of a turbine engine receives extremely hot combustion gases which have been generated in one or more combustors. To help the various components located in the turbine withstand the extremely high temperatures of the combustion gases, it is common to cool various elements within the turbine using cooling air. In some turbine engines, the cooling air used to cool the turbine is taken from the compressor section of the turbine engine.

BRIEF DESCRIPTION OF THE INVENTION

In one aspect, the invention may be embodied in a heat transfer system for a turbine engine that includes a cooling air duct connected between a compressor and at least one turbine stage of the turbine engine, and a plurality of heat pipes having first ends mounted in the cooling air duct, wherein the heat pipes conduct heat away from a flow of air passing through the cooling air duct.

In another aspect, the invention may be embodied in a heat transfer system for a turbine engine that includes a cooling air duct connected between a compressor and at least one turbine stage of the turbine engine, a first heat transfer unit coupled to the cooling air duct, and a plurality of heat pipes having first ends coupled to the first heat transfer unit, wherein the first heat transfer unit transfers heat from a flow of air passing through the cooling air duct into the first ends of the heat pipes.

In yet another aspect, the invention may be embodied in a method that includes removing a flow of air from a compressor of a turbine engine, removing heat from the flow of air with a plurality of heat pipes to create a flow of cooled air, and cooling the turbine of the turbine engine with the flow of cooled air.

DETAILED DESCRIPTION OF THE INVENTION

Figure 1:
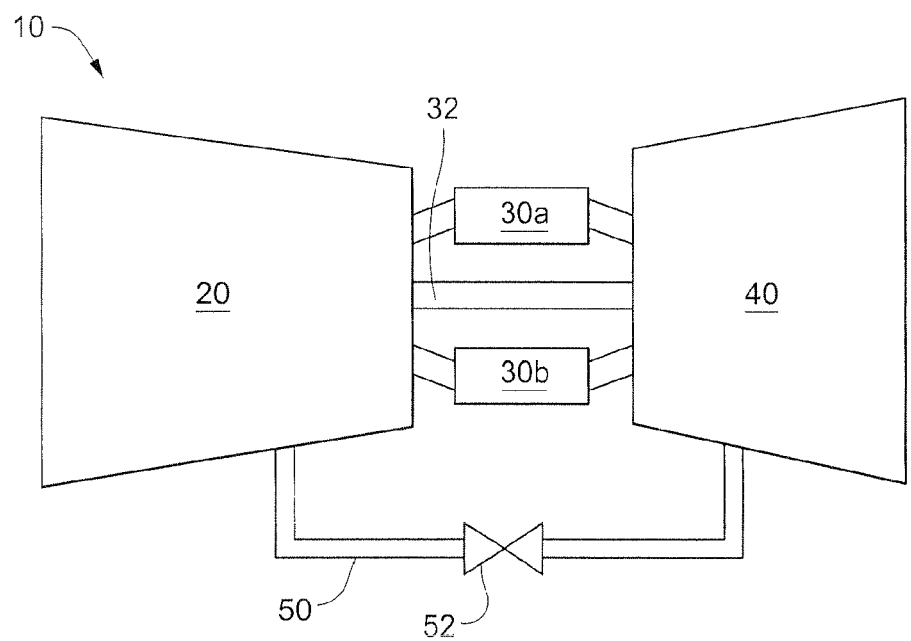
FIG. 1 illustrates the major elements of a turbine engine.

A diagram of the major elements of a turbine engine are illustrated in FIG. 1. The turbine engine includes a compressor section 20 and a turbine section 40. Rotating elements within the compressor 20 and the turbine 40 are connected to a rotating shaft 32.

Compressed air received from the compressor 20 is combined with fuel in the combustors 30a, 30b and the air fuel mixture is ignited within the combustors. The hot combustion gas created in the combustors 30a, 30b is then provided to the turbine 40.

The hot combustion gases provided to the turbine section 40 flow across nozzles and other hot path components within the turbine. The nozzles direct the hot combustion gases toward the turbine blades at an optimum angle, and the combustion gases cause the turbine blades to rotate the shaft 32 of the turbine engine. The hot combustion gases are at extremely high temperatures, and the high temperature gases tend to cause deterioration of the hot path components within the turbine.

To help the components within the turbine 40 withstand the extremely high temperatures of the hot combustion gases, cooling air is provided to the turbine 40. As shown in FIG. 1, a cooling air duct 50 takes air from the compressor section 20 and passes it to the turbine section 40. One or more valves 52 may be located in the cooling air duct 50 to control the flow of cooling air from the compressor 20 to the turbine 40.

Figure 2:
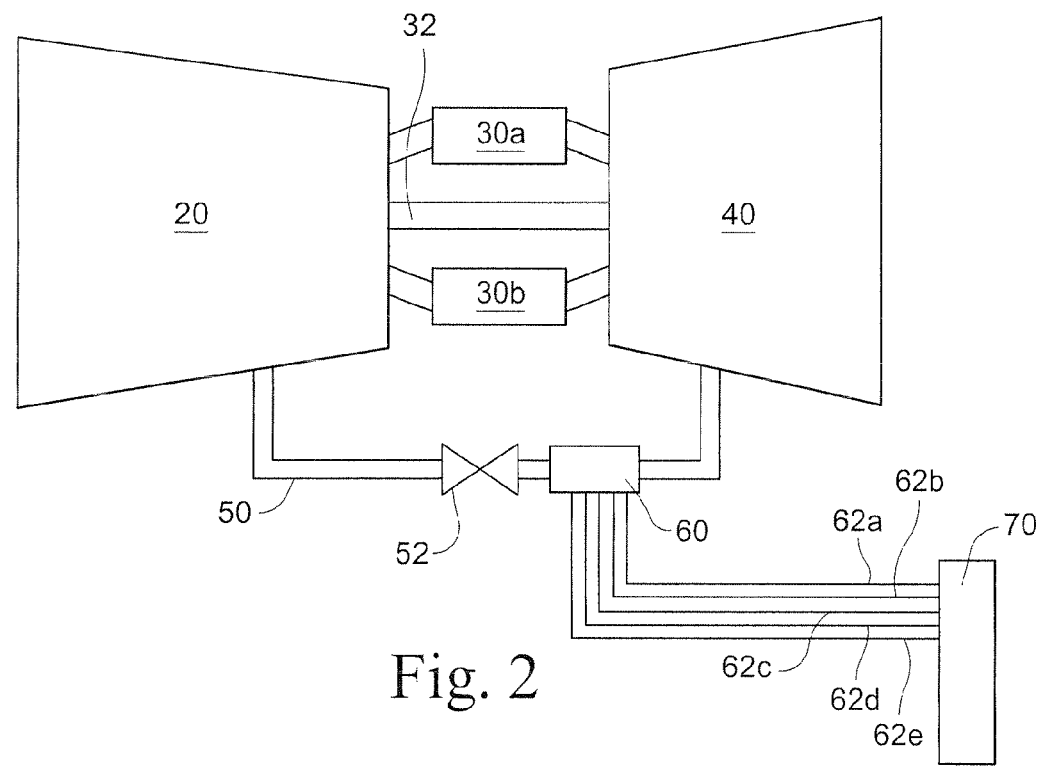
FIG. 2 illustrates a turbine engine with a cooling system utilizing heat pipes.

FIG. 2 illustrates an embodiment where a plurality of heat pipes 62a, 62b, 62c, 62d, 62e transfer heat from the flow of air passing through the cooling air duct. As shown in FIG. 2, first ends of the heat pipes receive or remove heat from the flow of air passing through the cooling air duct 50. The heat is then transferred to second ends of the heat pipes. The heat absorbed from the flow of air passing through the cooling duct 50 can then be removed from the second ends of the heat pipes. In some embodiments, the heat can be rejected to ambient air. In other embodiments, the heat removed from the heat pipes could be used for another secondary purpose. For example, it is known to use the heat removed from a flow of cooling air to heat fuel which is burned in the turbine engine, to reheat steam used as part of a power production process, or for other beneficial purposes.

When heat is removed from the flow of air passing through the cooling air duct, the cooling air delivered to the turbine is at a lower temperature, which enhances the cooling effect. This allows the same volume of cooling air to better cool the elements in the turbine. Alternatively, the same degree of cooling of the turbine could be achieved with a lesser volume of air from the compressor if the heat pipes are used to cool the air before it is delivered to the turbine.

As known to those of ordinary skill in the art, a heat pipe typically includes a sealed pipe with a fluid inside. When a first end of the heat pipe is heated, fluid at the first end evaporates and the vapor flows to the second end of the heat pipe. When the vapor flows to the second end of the heat pipe it condenses, which releases the heat which originally caused the fluid to vaporize. This vaporization and condensation process tends to create a continuous flow of the material within the heat pipe, which efficiently transfers heat from the first end of the pipe to the second end of the pipe.

An alternative type of heat pipe, known as an inorganic material coated heat pipe (IMCHP), does not use a fluid/vapor material to transfer heat from one end of the pipe to the other. In an inorganic material coated heat pipe, the inner surfaces of the pipe are coated with a special heat conducting material. Vapor is removed from within the pipe to create a vacuum inside the pipe. The pipe is then permanently sealed. The special heat conducting inorganic material located on the inner surfaces of the heat pipe transfers heat from one end of the pipe to the other. An inorganic material coated heat pipe can provide faster transfer of heat from one end to the other than more traditional heat pipes.

Individual embodiments of the invention could make use of a heat pipe containing a fluid, an inorganic material coated heat pipe, or any other type of thermal management device.

Figure 3:
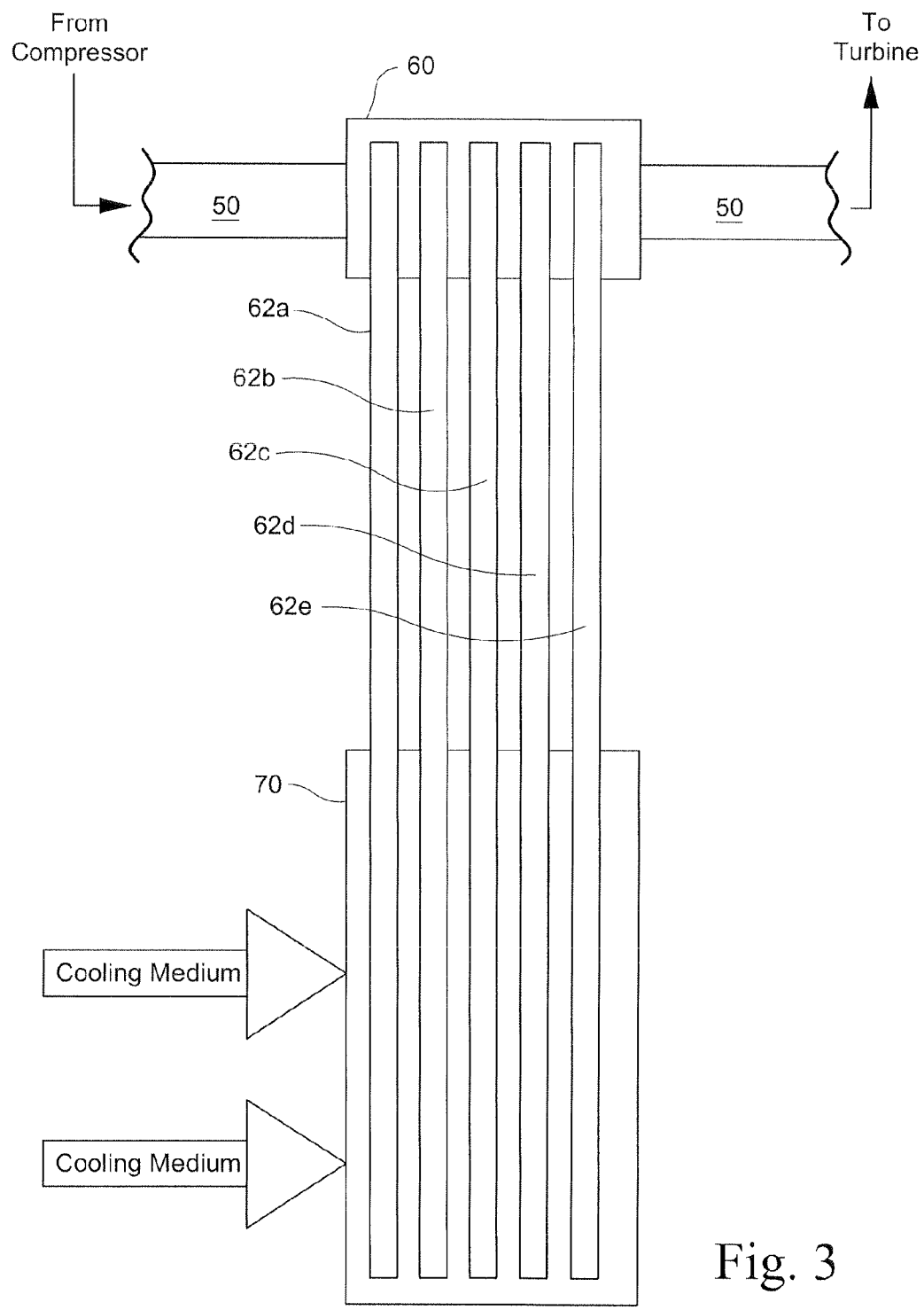
FIG. 3 illustrates key elements of a system used to remove heat from cooling air that is used to cool a turbine engine.

FIG. 3 illustrates one embodiment of a system that removes heat from a flow of air that is to be provided to the turbine of an engine. As shown in FIG. 3, a flow of cooling air received from a compressor would be communicated through a cooling air duct 50. First ends of the plurality of heat pipes 62a, 62b, 62c, 62d, 62e would be mounted so that the flow of air passing through the cooling air duct 50 flows over the first ends of the heat pipes. This would allow the first ends of the heat pipes to absorb heat from the flow of air passing through the cooling air duct 50.

In the embodiment shown in FIG. 3, the second ends of the heat pipes are located in a heat exchanger 70, and a flow of ambient air or some other cooling media passes across the second ends of the heat pipes to remove heat from the second ends of the heat pipes. The flow of coolant passing through the heat exchanger 70 could be ambient air, fuel gas, cooling water, or some other type of media.

In alternate embodiments of the invention, heat could be removed from the second ends of the heat pipes using a different type of heat exchanger 70. For instance a flow of a liquid or a gas through the heat exchanger 70 could also be used to remove heat from the second ends of the heat pipes. In still other embodiments, the second ends of the heat pipes could be embedded in a solid heat conducting material, and the solid heat conducting material could be placed in a liquid or gas flow that serves to remove heat from the second ends of the heat pipes.

Also, as described above, the heat removed from the second ends of the heat pipes could be used for a beneficial purpose. In that instance, the way in which heat is removed from the second ends of the heat pipes could depend on the purpose to which the heat energy is being put. For example, the thermal energy could be used to power an absorption chiller to provide cooling to a building.

In the embodiment illustrated in FIG. 3, the first ends of the heat pipes are simply shown as being located in the flow of air passing through the cooling air duct 50. In some embodiments, a heat exchanger unit 60 could be used to transfer heat from the flow of air passing through the cooling air duct 50 into the first ends of the heat pipes. This heat exchanger unit 60 could include a secondary fluid or a secondary gas to facilitate the transfer of heat from the flow of air passing through the cooling duct to the first ends of the heat pipes. In still other embodiments, the first ends of the heat pipes could be mounted in a solid heat conducting material, and the solid material could then be placed in the flow of air passing through the cooling air duct 50.

In still other alternate embodiments, cooling fins could be arranged on either or both ends of the heat pipes. Cooling fins on the first ends of the heat pipes would facilitate the transfer of heat from the air passing through the cooling air duct into the heat pipes. Likewise, fins on the second ends of the heat pipes would facilitate the transfer of heat out of the heat pipes and into ambient air or some other medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A heat transfer system for a turbine engine, comprising:
   a cooling air duct connected between a compressor and at least one turbine stage of the turbine engine; and
   a plurality of heat pipes having first ends mounted in the cooling air duct, wherein the heat pipes conduct heat away from a flow of air passing through the cooling air duct; and
   a heat transfer unit coupled to second ends of the heat pipes, wherein a flow of coolant passes through the heat transfer unit, and wherein heat from the flow of air passing through the cooling air duct which is transferred into the first ends of the heat pipes is removed from the second ends of the heat pipes by the coolant passing through the heat transfer unit.

2. The heat transfer system of claim 1, wherein the cooling air duct receives a flow of air from the compressor and delivers the flow of air to the at least one turbine stage of the turbine engine to cool the at least one turbine stage.

3. The heat transfer system of claim 1, wherein the flow of coolant passing through the heat transfer unit comprises ambient air.

4. The heat transfer system of claim 1, wherein the cooling air duct delivers cooling air to at least one of a second and a third wheelspace of the turbine of the turbine engine.

5. The heat transfer system of claim 1, wherein the second ends of the heat pipes are mounted in a solid heat conducting material, and wherein heat is transferred from the second ends of the heat pipes to the solid heat conducting material, and then from the solid heat conducting material to the flow of coolant passing through the heat transfer unit.

6. The heat transfer system of claim 5, wherein first ends of the heat pipes are mounted in a solid heat conducting material, wherein heat is transferred from the flow of air passing through the cooling air duct to the solid heat conducting material and then from the solid heat conducting material to the first ends of the heat pipes.

7. The heat transfer system of claim 1, wherein first ends of the heat pipes are mounted in a solid heat conducting material, and wherein heat is transferred from the flow of air passing through the cooling air duct to the solid heat conducting material and then from the solid heat conducting material to the first ends of the heat pipes.

8. A heat transfer system for a turbine engine, comprising:
   a cooling air duct connected between a compressor and at least one turbine stage of the turbine engine;
   a first heat transfer unit coupled to the cooling air duct;
   a plurality of heat pipes having first ends coupled to the first heat transfer unit, wherein the first heat transfer unit transfers heat from a flow of air passing through the cooling air duct into the first ends of the heat pipes; and
   a second heat transfer unit coupled to second ends of the heat pipes, wherein a flow of coolant passes through the second heat transfer unit, and wherein heat from the flow of air passing through the cooling air duct which is transferred into the first ends of the heat pipes is removed from the second ends of the heat pipes by the flow of coolant passing through the second heat transfer unit.

9. The heat transfer system of claim 8, wherein the cooling air duct receives a flow of air from the compressor and delivers the flow of air to the at least one turbine stage of the turbine engine to cool the at least one turbine stage.

10. The heat transfer system of claim 8, wherein the coolant passing through the second heat transfer unit comprises ambient air.

11. The heat transfer system of claim 8, wherein the second ends of the heat pipes are mounted in a solid heat conducting material located in the second heat transfer unit, and wherein heat is transferred from the second ends of the heat pipes to the solid heat conducting material, and then from the solid heat conducting material to the flow of coolant passing through the heat transfer unit.

12. The heat transfer system of claim 11, wherein the first ends of the heat pipes are mounted in a solid heat conducting material located in the first heat transfer unit, and wherein heat is transferred from the flow of air passing through the cooling air duct to the solid heat conducting material, and then from the solid heat conducting material to the first ends of the heat pipes.

13. The heat transfer system of claim 8, wherein the first ends of the heat pipes are mounted in a solid heat conducting material located in the first heat transfer unit, and wherein heat is transferred from the flow of air passing through the cooling air duct to the solid heat conducting material, and then from the solid heat conducting material to the first ends of the heat pipes.

* * * * *